B. JANUSZEWSKI.
CAMERA SHUTTER OPERATING DEVICE.
APPLICATION FILED MAY 29, 1912.
1,045,149.
Patented Nov. 26, 1912.
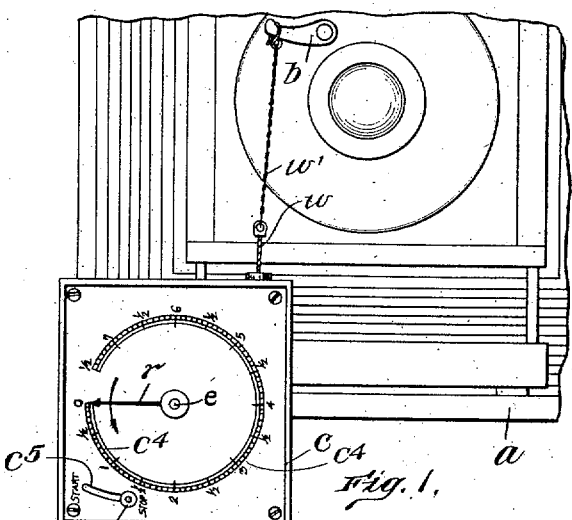
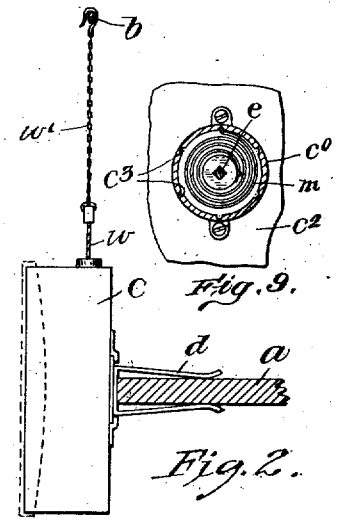
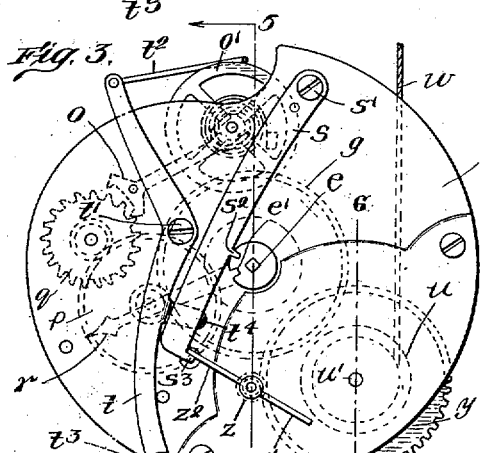
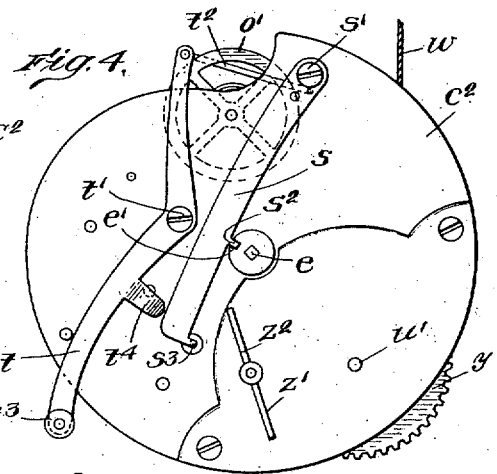
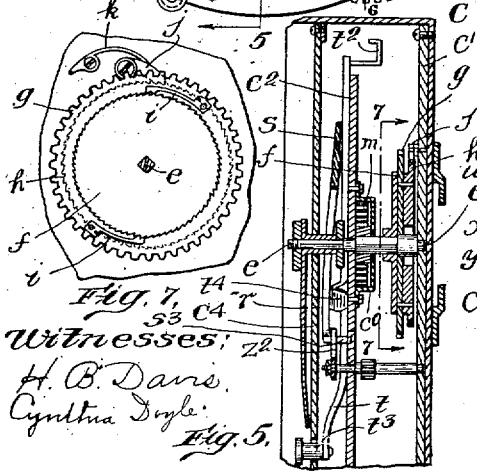
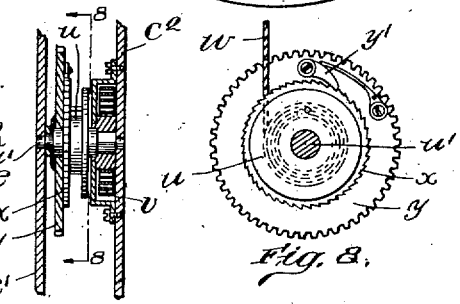
Witnesses:
H. B. Davis.
Cynthia Doyle.
Inventor:
Boleslaw Januszewski
by Hogrefe Hamman
Attys

UNITED STATES PATENT OFFICE.

BOLESLAW JANUSZEWSKI, OF REVERE, MASSACHUSETTS.

CAMERA-SHUTTER-OPERATING DEVICE.

1,045,149.   Specification of Letters Patent.   Patented Nov. 26, 1912.

Application filed May 29, 1912. Serial No. 700,364.

*To all whom it may concern:*

Be it known that I, BOLESLAW JANUSZEWSKI, a subject of the German Empire, residing at Revere, in the county of Suffolk and State of Massachusetts, have invented an Improvement in Camera-Shutter-Operating Devices, of which the following is a specification.

This invention relates to certain improvements in devices for operating the shutters of cameras automatically after a predetermined time, so that the operator may, for example, be given time to place himself within the range of the camera, after the camera is set, and before the shutter is opened.

The object of my invention is to provide a simple device which is adapted to be readily attached to any ordinary camera and which, with certain modifications, may be made to operate any one of the common devices for controlling camera shutters.

The present embodiment of my invention is shown as especially adapted to operate the usual thumb lever, although it may be readily adapted for use to operate other forms of shutter-controlling devices.

For an understanding of my invention reference is made to the accompanying drawing, in which, Figure 1 is a front elevation of my device showing the same in position on an ordinary camera. Fig. 2 is a side elevation thereof. Figs. 3 and 4 are elevations on an enlarged scale showing the parts of my device in different positions. Fig. 5 is a section at the line 5—5, of Fig. 3. Fig. 6 is a section at the line 6—6, of Fig. 3. Fig. 7 is a section at the line 7—7, of Fig. 5. Fig. 8 is a section at the line 8—8, of Fig. 6. Fig. 9 is a detail view of the main-spring for the time-operating mechanism.

In the drawing $a$ indicates an ordinary camera having the usual shutter-operating lever $b$.

According to my invention I provide a casing $c$, which is adapted to be attached to the camera in any convenient manner, as by means of spring arms $d$.

The mechanism of the device comprises a time-operating mechanism which is similar to an ordinary clock or watch movement, and an actuating mechanism which is adapted to actuate the shutter-operating mechanism when released by the time-operating mechanism. The time-operating mechanism comprises an arbor $e$, rotatably mounted in bearing-plates $c'$, $c^2$, secured within the casing, and having a square portion on which a ratchet-wheel $f$ is mounted and held against relative rotation. A cog-wheel $g$, having a ratchet-wheel $h$ connected thereto, is rotatably mounted on a round portion of the arbor $e$ in proximity to wheel $f$. A pair of pawls $i$, are mounted on the cog-wheel $g$ in position to engage the toothed periphery of the ratchet-wheel $f$, so that relative rotation is permitted in one direction and prevented in the other. A pawl $j$ is mounted on the plate $c'$ and is held, by a spring $k$, in contact with the ratchet-wheel $h$, so that rotation of the wheels $g$ and $h$ in only one direction is permitted. A main spring $m$ is arranged about the arbor $q$, in a cylindrical case $c^6$, secured on bearing plate $c^2$, one end of said spring being connected to the arbor and the other end being arranged to engage in any one of a series of holding notches $c^3$ formed in the walls of case $c^6$, so that only a certain tension may be placed on the spring under any condition, as the spring will slip from one holding notch to the next, when it has been wound to a certain extent. The gear-wheel $g$ is arranged to engage an escapement $o$ through intermediate gears $p$ and $q$, and said escapement is operated by an ordinary balance-wheel $o'$ which regulates the speed of the time-operating mechanism in the usual manner. A setting-hand $r$ is mounted on the arbor $e$, and is arranged on the outside of the casing which is provided with a dial $c^4$ graduated from an initial or zero position, in any desired manner.

A locking-device, in the form of a flat spring arm $s$, is secured by a screw $s'$, to the plate $c^2$ and is provided with an intermediate tooth $s^2$ at one side thereof, so arranged, that, under certain conditions, it may bear against the end of arbor $e$, or may enter a notch $e'$ formed in the end thereof. A controlling lever $t$ is pivoted on the plate $c^2$ by pivot $t'$, and is provided with an arm $t^2$ at one end, which is adapted to engage the periphery of the balance-wheel $o'$ in certain positions of said lever. A handle $t^3$ is connected to the opposite end of the lever $t$ and projects through the dial $c^4$, said dial being provided with a slot $c^5$ arranged to permit the lever $t$ to be swung from a position in which the arm $t^2$ will engage the balance-wheel, so as to stop the motion of the clock-mechanism, to a position in which said mechanism will be released. It is to be noted in this connection that the finger $t^2$ is held nearly tangentially with relation to the balance-wheel $o'$ so that the engagement of the arm with the balance-wheel will be light and will also be such as to cause the balance-wheel to oscillate when the arm is moved out of contact therewith. The lever $t$ also has an inclined lug $t^4$ at one side thereof, which is adapted to engage the under side of the spring arm $s$ in the "stop" position of the lever, to hold said arm $s$ out of contact with the end of the arbor $e$.

A winding drum $u$ is provided on a shaft $u'$ mounted in the plates $c'$, $c^2$, and a spring $v$ is connected at one end to said shaft $u'$ and encircles the same, and is connected at its other end to the plate $c^2$. A cord $w$ is connected to the drum $u$ and is adapted to be wound thereabout, so that, when the cord is pulled from the drum, the spring $v$ will be wound, and when the cord is released it will be wound on the drum by the spring. Said cord is adapted to be connected by a chain $w'$ to the shutter operating lever $b$, as shown in Fig. 1.

A ratchet-wheel $x$ is mounted on and secured to the shaft $u'$ and a gear wheel $y$ is rotatably mounted thereon at one side thereof. A pawl $y'$ is mounted on the gear $y$ in engagement with the teeth of ratchet-wheel $x$, so that relative rotation in one direction only is permitted. A pinion $z$ is arranged in mesh with the gear $y$ and said pinion has a pair of oppositely extending arms $z'$, $z^2$, thereon, which are arranged to swing into engagement with a lug $s^3$ on the end of arm $s$, in certain positions of said arm.

The operation of my device is as follows:—The lever $t$ is normally held in the "stop" position of Fig. 3, in which position its arm $t^2$ engages the balance-wheel $p$ and holds the same stationary. At the same time the arm $s$, is supported by lug $t^4$ which has been forced thereunder, so that the lug $s^2$ is held out of contact with the arbor $e$. The camera lever $b$ is first set, so that the shutter will be opened when said lever is moved, and then the cord $w$ is pulled outwardly and attached to the shutter operating-lever $b$. This action will cause the spring $v$ to be wound, the ratchet-wheel $x$ being moved forward with relation to the pawl $y'$, so that when the cord is released the spring tends to drive the wheel $y$ and pinion $z$ through the pawl $y'$. As the lug $s^3$ is now held in the path of arms $z'$, $z^2$, one of them will immediately be moved into engagement therewith, so that the drum is locked against rotation by the spring, as shown in Fig. 3. The hand $r$ is then swung in the direction of the arrow in Fig. 1, to any desired position from the zero point, as for instance, if it is desired to have the shutter operate in one minute, the hand is moved to the point $l$ on the dial, as indicated by the dotted line position of Fig. 3. This causes the main-spring $m$ to be wound, and, at the same time, the arbor $e$ to be moved to such a position that the notch $e'$ therein is at one side of the lug $s^3$, as shown in Fig. 3. As the hand $r$ is rotated back, turning the arbor $e$ and winding the spring $m$, the ratchet $f$ will be rotated forward with relation to the pawls $i$, while the wheel $g$ will be held from rearward rotation by pawl $j$ acting on ratchet $h$, and, when the hand has been swung as far as desired, forward rotation under the action of the spring $m$ is prevented by arm $t^2$. The starting-lever $t$ is then moved to the "start" position of Fig. 4, causing the balance-wheel to be started, so that the mechanism will be driven, and, at the same time, the lug $t^4$ will be moved out of contact with the arm $s$ permitting it to swing down, so that its lug $s^2$ bears on the end of the arbor $e$. The arm $z^2$, however, still engages the lug $s^3$ so that the winding drum $u$ is still locked. The mechanism continues to operate until the notch $e'$ passes into register with the lug $s^2$, so that the arm $s$ will no longer be supported by the arbor $e$ and will move laterally, so that the lug $s^2$ will pass into the notch $e'$. The arbor $e$ will thus be locked against further forward movement by the lug $s^2$, this locking operation occurring as the hand $r$ reaches the zero point. The lateral movement of the arms causes its lug $s^3$ to be moved out of engagement with the arm $z^2$, permits the spring $u$ to operate the winding-drum to wind the cord $w$ thereon, thereby causing the shutter operating lever to be moved, and the exposure to be made.

When the device is to be reset, the lever $t$ will be moved to the "stop" position lifting the arm $s$, so that it is moved out of locking engagement with the arbor $e$ and so that its lug $s^3$ is again moved into position to be engaged by the arms $z'$ or $z^2$ when the cord $w$ is again drawn out to wind the actuating device. The operation above described may then be repeated.

By having the main-spring $m$ disconnected from its case the hand $r$ may be turned backward from any point to the zero point without straining the spring.

I claim:—

1. An automatic operating-device for cameras comprising an actuating-spring, a locking-device for holding said spring under tension, time-operating-mechanism for controlling said locking-device, a controlling-device for starting and stopping said mechanism, and means operated by said controlling-device to hold said locking-device in locking position when said controlling device is in stopping position, and to release said locking-device when moved to starting position.

2. An automatic operating-device for cameras comprising an actuating-spring, a locking-device for holding said spring under tension, time-operating-mechanism, movable between a starting and a stopping position, means carried by said mechanism to hold said locking-device in locking position when said mechanism is in starting position, and means to move said locking device out of locking position when said mechanism is moved to stopping position.

3. An automatic operating-device for cameras comprising an actuating-spring, a locking-device for holding said spring under tension, time-operating-mechanism movable between a starting and an operating position and having a recessed face for holding said locking-device in locking position when said mechanism is out of operating position, and means to move said locking device into said recess to release said spring when said mechanism is moved into operating position.

4. An automatic operating-device for cameras comprising an actuating-spring, a locking-device for holding said spring under tension, time-operating-mechanism for controlling said locking-device, a controlling-device for starting and stopping said mechanism, and means operated by said controlling-device to hold said locking-device in locking position when said controlling-device is in stopping position, and to release said locking-device when moved to starting position, means normally actuated to move said locking-device to unlocked position, and means carried by said controlling-mechanism for holding said locking-device in locking position when it has been released by said controlling-device, said means being movable to permit said locking-device to move to unlocked position when said mechanism moves to operating position.

5. An automatic operating-device for cameras comprising an actuating-spring, a locking-device for holding said spring under tension, time-operating-mechanism movable between a starting position and an operating position, a controlling-device having means for simultaneously engaging said mechanism to prevent movement thereof and to hold said locking-device in locking position and movable to start said mechanism and release said locking-device, and means controlled by said operating-mechanism for holding said locking-device in operative position when said mechanism is out of operating position and permitting said locking-device to move to release said spring when said mechanism is moved to operating position.

6. An automatic operating-device for cameras comprising an actuating-spring, a time-operating-mechanism movable from a starting to an operating position, locking-devices for holding said spring under tension and said mechanism from movement, and means, controlled by said mechanism when it is moved to operating mechanism, to move said devices to release said spring and lock said mechanism.

7. An automatic operating-device for cameras comprising an actuating-spring, a time-operating-mechanism movable from a starting to an operating position, locking-devices for holding said spring under tension and said mechanism from movement, and means to move said locking devices simultaneously to release said spring and lock said mechanism when said mechanism is moved to operating position.

8. An automatic operating-device for cameras comprising an actuating-spring, a time-operating-mechanism movable from a starting to an operating position, a locking-arm having means to hold said spring under tension and said operating mechanism against movement, and means, controlled by said mechanism when moved to operating position to move said arm to disengage said spring and lock said mechanism.

In testimony whereof, I have signed my name to this specification, in the presence of two subscribing witnesses.

BOLESLAW JANUSZEWSKI.

Witnesses:
L. H. HARRIMAN,
H. B. DAVIS.